March 1, 1960 J. HIMKA ET AL 2,926,949
VEHICLE SEATING ARRANGEMENT
Filed April 24, 1958 2 Sheets-Sheet 2
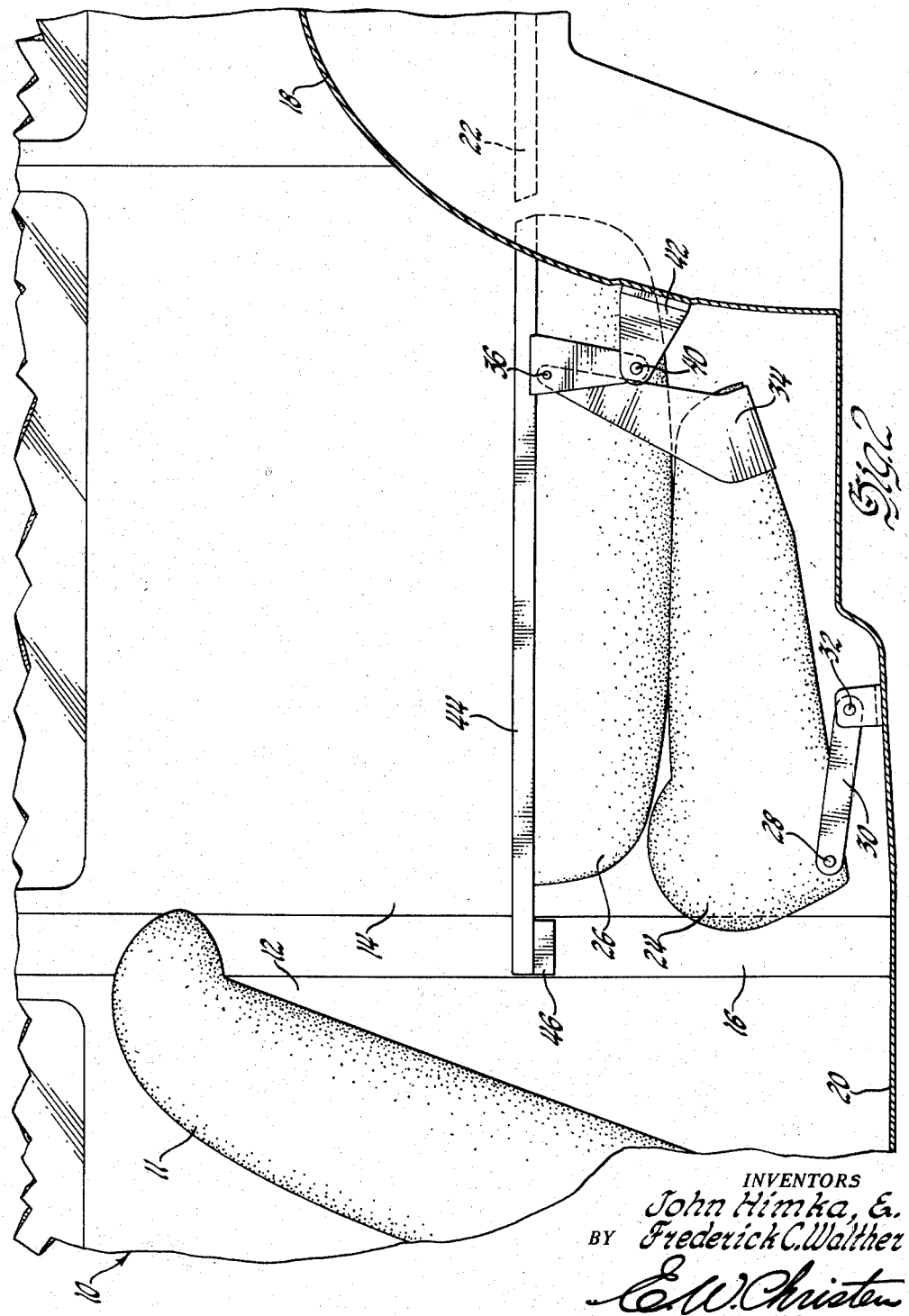
INVENTORS
John Himka, &
BY Frederick C. Walther
E.W. Christen
ATTORNEY

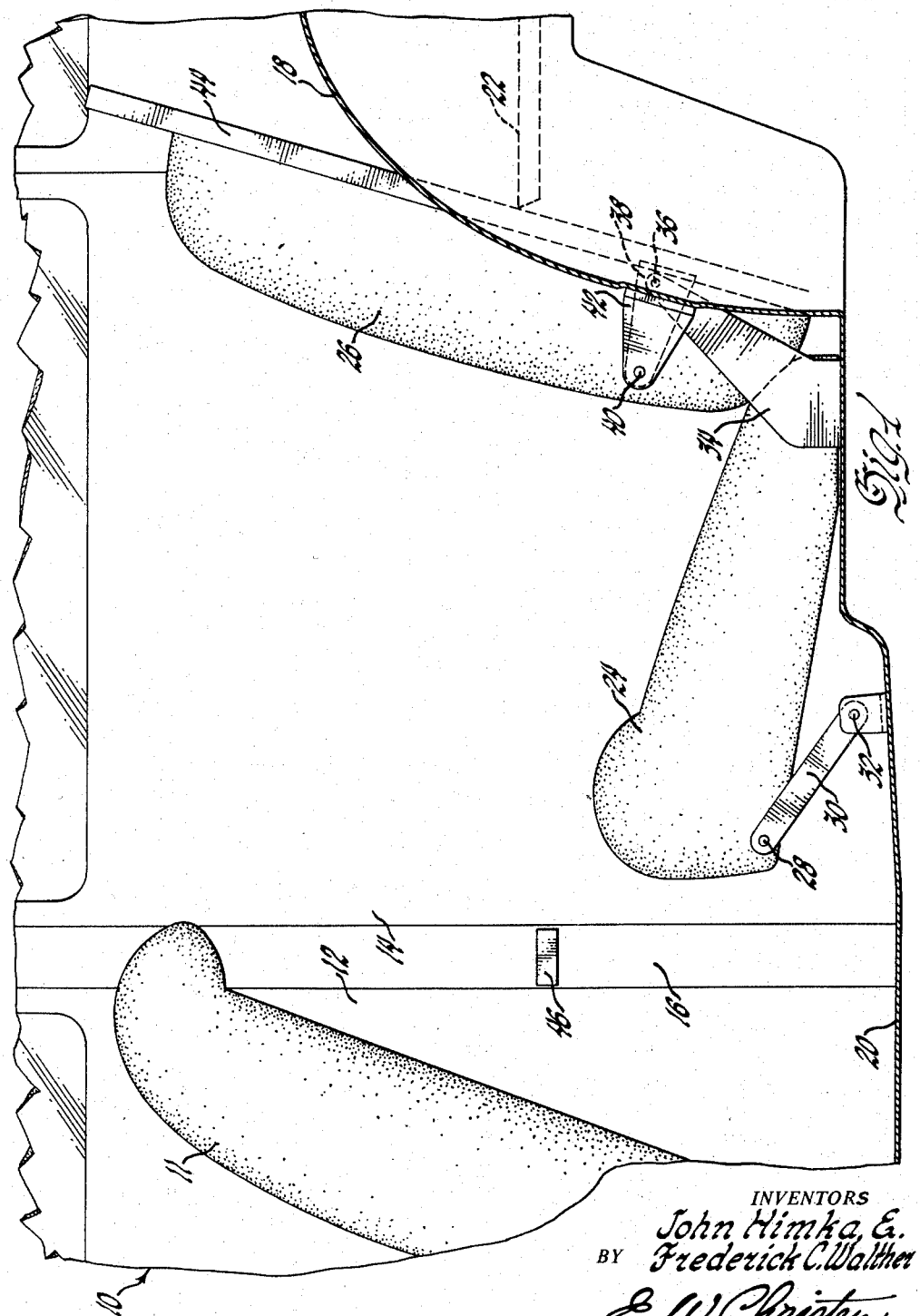

United States Patent Office 2,926,949
Patented Mar. 1, 1960

2,926,949

VEHICLE SEATING ARRANGEMENT

John Himka, Detroit, Mich., and Frederick C. Walther, Santa Barbara, Calif., assignors to General Motors Corporation, Detroit, Mich., a corporation of Delaware Application April 24, 1958, Serial No. 730,604

2 Claims. (Cl. 296—66)

This invention relates to vehicle seats and more particularly to a foldable seat arrangement.

The seating arrangement of the invention is intended for use in multi-purpose vehicles such as station wagons. Station wagons commonly have a second passenger seat disposed rearwardly of the driver's seat and it is desirable that the second seat be movable from an upright position where a seat is presented to a folded position where a secondary floor is presented above the front floor for load carrying purposes. When the second seat is in folded position in accordance with the invention, the seat bottom is stored forwardly of its upright position and the seat back is folded thereover with the rear side thereof providing a level continuation for the rear floor which is elevated with respect to the front floor to provide rear axle clearance.

An object of the invention is to provide the seat back and seat bottom with interconnecting and supporting means that automatically shifts the seat bottom into proper stowage when the seat back is swung from upright to folded position.

In the drawings:

Figure 1 is a partial sectional view of a station wagon body with the second seat upright for passenger carrying purposes; and Figure 2 is a view similar to Figure 1 with the second seat folded for load carrying purposes.

Referring to the drawings, a station wagon body 10 includes a driver's seat 11, front and rear doors 12 and 14, center door pillars 16, rear wheel housings 18, a front floor 20, and a higher rear floor 22.

The second seat includes a seat bottom 24 and a seat back 26. At the lower front portion of the seat bottom 24 pivot connections 28 connect to the forward ends of a pair of links 30 which have pivot connections 32 at their rearward ends to the floor 20. The front portion of the seat bottom 24 is thus swingable in a forward and downward direction for stowage. The rear portion of the seat bottom 24 rests on the floor 20 and has a pair of levers 34 secured thereto that extend upwardly and rearwardly. The levers 34 have pivot connections 36 with a pair of brackets 38 which are secured on opposite sides of the lower portion of the seat back 26. The brackets 38 have pivot connections 40 with a pair of supports 42 that are mounted on the rear wheel housings 18. While the drawings show only the parts on the left side, it is understood that identical parts are provided on the right side.

To move the seat from the upright position of Figure 1 to the folded or stowage position of Figure 2 the seat back 26 is swung manually in a forward direction about the pivots 40. This folding movement of the seat back 26 swings the seat bottom levers 34 in an upward and forward direction through the pivot connections 36 causing the front portion of the seat bottom 24 to swing forwardly and downwardly on an arc set by the links 30. The rear side of the seat back 26 has a secondary floor 44 which engages supporting lugs 46 on the center pillars 16 when the seat is folded. The secondary floor 44 thus extends the rear floor 22 for load carrying purposes. The pivots 36 are slightly forward of the pivots 40 when the seat is folded so that the secondary floor wil be stable. The seat back 26, when upright, is supported against rearward swinging movement by the pivot connections 36 to the levers 34.

While the embodiment of the present invention as herein disclosed constitutes a preferred form, it is to be understood that other forms might be adopted.

We claim:

1. In a vehicle body of the type having a front floor, a stowable seat bottom, and a seat back movable from an upright position where a passenger seat is presented to a folded position where a secondary floor is presented above the front floor by the rear side of the seat back, the improvement comprising bracket means secured to the lower portion of the seat back and having a pivotal connection with the body above the front floor, lever means rigidly secured to the rear portion of the seat bottom and extending upwardly and rearwardly therefrom and having a pivotal connection with the bracket means at a point spaced from the bracket to body pivotal connection, and linkage means having a forward pivotal connection to the lower front portion of the seat bottom and a rearward pivotal connection to the front floor, whereby a swinging movement of the seat back about the bracket to body pivotal connection from upright to folded position moves the lever means to swing the seat bottom forwardly for stowage on the linkage means.

2. In a vehicle body of the type having a front floor, a stowable seat bottom, and a seat back movable from an upright position where a passenger seat is presented to a folded position where a secondary floor is presented above the front floor by the rear side of the seat back, the improvement comprising bracket means secured to the lower portion of the seat back and having a pivotal connection with the body at a point directly above the rear portion of the seat bottom, lever means rigidly secured to the rear portion of the seat bottom and extending upwardly and rearwardly therefrom and having a pivotal connection with the bracket means at a point spaced directly rearward of the bracket to body pivotal connection with the seat in upright position, the lever to bracket pivotal connection being located above and forward of the bracket to body pivotal connection with the seat in folded position, and linkage means having a forward pivotal connection to the front lower portion of the seat bottom and a rearward pivotal connection to the front floor, whereby a swinging movement of the seat back about the bracket to body pivotal connection from upright to folded position moves the lever means forwardly and upwardly to swing the front portion of the seat bottom forwardly and downwardly on the linkage means for stowage.

References Cited in the file of this patent

UNITED STATES PATENTS 1,841,290    Katzman _____ Jan. 12, 1932

FOREIGN PATENTS 389,855    Germany _____ Feb. 9, 1924
146,542    Sweden _____ Aug. 17, 1954